United States Patent [19]

Schuster et al.

[11] Patent Number: 5,532,308

[45] Date of Patent: Jul. 2, 1996

[54] METHOD FOR IMPROVING RETENTION AND DRAINAGE CHARACTERISTICS IN ALKALINE PAPERMAKING

[75] Inventors: Michael A. Schuster; John C. Harrington, IV, both of Jacksonville, Fla.; Wen P. Liao, Warminster; Fu Chen, Newtown, both of Pa.

[73] Assignee: Betz PaperChem, Inc., Jacksonville, Fla.

[21] Appl. No.: 373,706

[22] Filed: Jan. 17, 1995

Related U.S. Application Data

[60] Division of Ser. No. 217,037, Mar. 24, 1994, Pat. No. 5,415,740, which is a continuation-in-part of Ser. No. 773, Jan. 5, 1993, Pat. No. 5,298,566, which is a division of Ser. No. 691,206, Apr. 25, 1991, Pat. No. 5,211,854.

[51] Int. Cl.$^6$ .............................. C08L 51/06; D21H 17/37
[52] U.S. Cl. ............................. 524/447; 162/168.3
[58] Field of Search ........................... 524/447; 525/296

[56] References Cited

U.S. PATENT DOCUMENTS

| | | | |
|---|---|---|---|
| 3,860,414 | 1/1975 | Lang et al. | 75/3 |
| 4,311,635 | 1/1982 | Pearson | 260/42.49 |
| 4,483,958 | 11/1984 | Kosaka | 524/409 |
| 4,500,670 | 2/1985 | McKinley et al. | 524/445 |
| 5,173,532 | 12/1992 | Endo et al. | 524/425 |
| 5,211,854 | 5/1993 | Liao et al. | 210/734 |
| 5,216,062 | 6/1993 | Lausberg et al. | 524/404 |
| 5,298,566 | 3/1994 | Liao et al. | 525/296 |

OTHER PUBLICATIONS

"Pulp & Paper Chemistry of Chemical Technology", 3d ed., vol. III, 1981, pp. 1593–1607.

Betz Handbook of Industrial Water Conditioning, 9th ed., 1991, pp. 22–30.

*Primary Examiner*—Vasu S. Jagannathan
*Attorney, Agent, or Firm*—Alexander D. Ricci; Philip H. Von Neida

[57] ABSTRACT

A composition and method for improving the drainage and retention characteristics of a paper furnish consisting of a water soluble graft copolymer and bentonite clay. It is preferred that the graft copolymer be added to the furnish prior to at least one shear stage and that the bentonite clay be added after the shear stage.

10 Claims, No Drawings

METHOD FOR IMPROVING RETENTION AND DRAINAGE CHARACTERISTICS IN ALKALINE PAPERMAKING

This is a divisional of application Ser. No. 08/217,037 filed Mar. 24, 1994, now U.S. Pat. No. 5,415,740 which is a continuation-in-part of Ser. No. 08/000,773 filed Jan. 5, 1993 now U.S. Pat. No. 5,298,566 which is a divisional of Ser. No. 07/691,206 filed Apr. 25, 1991, now U.S. Pat. No. 5,211,854.

FIELD OF THE INVENTION

The present invention relates the process of making paper. Specifically disclosed is a method for improving the retention and drainage properties of the aqueous pulp slurry during the production of paper.

BACKGROUND OF THE INVENTION

Paper or paperboard is made by producing an aqueous slurry of cellulosic wood fiber, which may also contain inorganic mineral extenders or pigments, depositing this slurry on a moving papermaking wire or fabric, and forming a sheet from the solid components by draining the water. This process is followed by pressing and drying sections. Organic and inorganic chemicals are often added to the slurry before the sheet forming process to make the papermaking process less costly or more rapid, or to attain specific properties in the final paper product.

The paper industry continuously strives to improve paper quality, increase process speeds, and reduce manufacturing costs. Chemicals are often added to the fibrous slurry before the papermaking wire to improve the drainage and retention performance on the machine wire. These chemicals and chemical programs are called retention and/or drainage aids.

Papermaking retention aids are used to increase the retention of fine furnish solids in the web during the turbulent process of draining and forming the paper web. Without adequate retention of the fine solids, they are either lost to the process effluent or accumulate to excessively high concentrations in the recirculating white water loop and cause production difficulties including deposit buildup and impaired paper machine drainage. Additionally, insufficient retention of the fine solids and the disproportionate quantity of chemical additives which are adsorbed on their surfaces reduces the papermaker's ability to achieve necessary paper quality specifications such as opacity, strength, and sizing.

The dewatering, or drainage, of the fibrous slurry on the papermaking wire is often the limiting step in achieving faster process speed. This is also the stage in the paper papermaking process which determines many paper sheet final properties. Drainage aids will assist in the drainage/dewatering of the pulp slurry.

Typically, a fibrous slurry is deposited on the papermaking wire from the headbox at a consistency (fiber and filler solids content) of 0.5 to 1.5%; the resultant fibrous mat that is removed from the wire at the couch roll and transferred to the pressing section is approximately 20% consistency. Depending upon the machine size and speed, large volumes of water are removed in a short period of time, typically 1 to 3 seconds. The efficient removal of this water is critical in maintaining process speeds.

GENERAL DESCRIPTION OF THE INVENTION

The present invention is directed to an improved process for making paper or paperboard, and a composition used in the process which becomes an integral part of the produced paper. The process entails the normal steps of providing a paper furnish comprised of cellulosic fibers with or without additional mineral fillers suspended in water, depositing the furnish on a papermaking wire, and forming a sheet out of the solid components of the furnish while carried on the wire.

It has been discovered that a two component retention process provides superior retention and drainage properties to conventional programs. The inventive process involves the sequential addition of a water soluble cationic graft copolymer, followed by the addition of a water swellable clay, such as bentonite. It is preferred that a shear point, such as a stock pump, be utilized between the cationic polymer graft copolymer and the water swellable clay for optimal performance results.

DETAILED DESCRIPTION OF THE INVENTION

The inventive composition imparts enhanced drainage and retention characteristics to a papermaking process. It is especially useful in improving drainage during the processing of pulp from which heavier weight papers are formed, such as those having a basis weight of more than 75 pounds per 3300 ft$^2$.

The composition consists of a water soluble graft copolymer and a bentonite clay wherein the active weight ratio of copolymer:bentonite is from about 2:1 to 1:20.

Specifically, the graft polymers in the invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

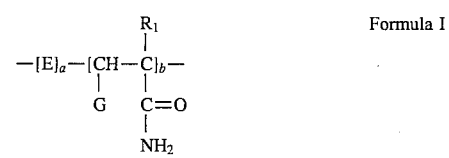

Formula I wherein E in the above formula (Formula I) is the repeat unit obtained after polymerization of an a,βethylenically unsaturated compound, preferably carboxylic acid, amide form thereof, alkyl (C1–C8) ester, or hydroxylated alkyl (C1–C8) ester of such carboxylic acid or sulfonic acid. Compounds encompassed by E include the repeat unit obtained after polymerization of acrylamide, methacrylamide, acrylic acid, methacrylic acid, maleic acid or anhydride, styrene sulfonic acid, 2-acrylamico-2-methylpropyl sulfonic acid, itaconic acid and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

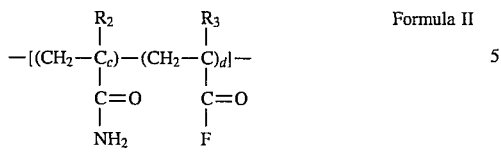

Formula II wherein $R_1$, $R_2$ and $R_3$ in Formulae I and II are the same or different and are hydrogen or a lower alkyl group having $C_1$ to $C_3$. Monomer d is a cationic monomer. F in the above formula is a salt of an ammonium cation, such as $NHR_3N+R_{(4,5,6)}M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and M is an anion, such as chloride, bromide or methyl or hydrogen sulfate. Typical cationic monomers are 2-acryloyloxyethyltrimethyl ammonium chloride (AETAC), 3-methacrylamidopropyltrimethyl ammonium chloride (MAPTAC), 2-methacryloyloxyethyltrimethylammonium chloride (METAC) and diallyl dimethylammonium chloride (DADMAC), etc.

It is to be understood that more than one kind of cationic monomer may be present in Formula II.

The molar percentage c:d in Formula II may vary from 5:5 to 5:95, with the proviso, however, the sum of c and d equals 100%.

There is no limit to the kind and mole percent of the monomers chosen so long as the total adds up to 100 mole % and the resulting copolymers are water soluble.

At present, the preferred water soluble graft copolymer is:

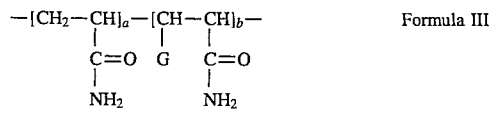

Formula III

The molar percentage of a:b is from about 95:5 to 5:95, with the proviso that the sum of a and b equals 100%. G in Formula III is:

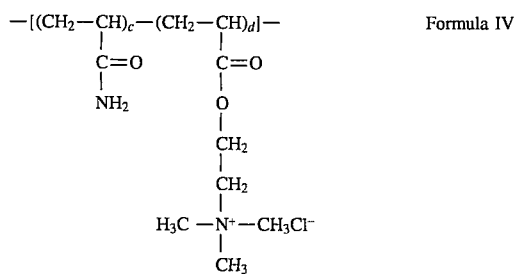

Formula IV

Monomer d is 2-acryloyloxyethyltrimethyl ammonium chloride (AETAC). The molar percentage c:d in the polymer segment G (Formula IV) is the ratio of Acrylamide: AETAC. It may fall within the range between 95:5 and 5:95. The sum of c and d must add up to 100%.

The number average molecular weight (Mn) of the copolymer is from about 10,000 to 30,000,000.

The method of preparing the water soluble graft copolymer used in this invention is disclosed in U.S. Pat. No. 5,211,854, herein wholly incorporated by reference.

The bentonite can be any of the materials commercially referred to as bentonites or as bentonite-type clays, i.e., anionic swelling clays such as sepialite, attapulgite or, preferably, montmorillinite. The montmorillinites are preferred. Bentonites broadly as described in U.S. Pat. No. 4,305,781 are suitable. Suitable montmorillonite clays include Wyoming bentonite or Fullers Earth. The clays may or may not be chemically modified, e.g., by alkali treatment to convert calcium bentonite to alkali metal bentonite. The swelling clays are usually metal silicates wherein the metal comprises a metal selected from aluminum and magnesium, and optionally other metals, and the ratio silicon atoms::metal atoms in the surface of the clay particles, and generally throughout their structure, is from about 5:1 to 1:1.

In practicing the invention, the graft copolymer should be added to the furnish prior to at least one high shear stage. The shear device can be either a mixing pump, a fan pump or the centiscreen. After the furnish containing the graft copolymer has been sheared, the bentonite clay may then be added.

Dosage levels for the graft copolymer range from 0.05 to 10 pounds per ton, and preferably 0.10 to 5 pounds per ton, active polymer to active furnish solids. The copolymer is best applied to the furnish as a dilute aqueous solution. Dosage levels for the bentonite clay are in the range of about 0.25 to 25 pounds per ton of active clay to active furnish solids. The preferred range is about 0.5 to 10 pounds per ton.

The efficacy of the present invention will now be demonstrated by the following example.

EXAMPLE

Laboratory retention and drainage studies were conducted utilizing, respectively, dynamic Britt jar and Canadian Standard Freeness devices. A synthetic alkaline furnish was produced in the laboratory and consisted of a 50/50 blend of hardwood/softwood refined to a 350–400 CSF, which further contained 20% total precipitated calcium carbonate filler.

Two cationic graft copolymers were prepared in accordance with the synthesis procedures described in U.S. Pat. No. 5,211,854. Each, Examples 1 and 2, contain 95 mole percent acrylamide and 5 mole percent 2-acryloyloxyethyltrimethyl ammonium chloride (AETAC). Linear polymers utilizing the same monomers in the same ratios were prepared for comparison, on a water-in-oil emulsion, Comparative Example 1, and the other, a 100% active powder, Comparative Example 2. Tests were performed first on the individual polymers and then in conjunction with the bentonite clay.

Experimental

Canadian Standard Freeness procedures were followed for drainage results. Dosages of the respective polymers and bentonite clay are as shown in Table I.

Test samples consisted of 1000 ml of a synthetic alkaline furnish, having a consistency of 0.286%. The samples with polymer were subjected to shearing at 1400 rpm for 15 seconds, and for those samples containing the bentonite clay, followed by shearing at 1400 rpm for 60 seconds which was reduced to 1000 rpm for 15 more seconds.

To demonstrate retention properties, Standard Britt Jar Retention testing was performed utilizing the same dosages as for drainage testing. The test samples were 500 ml of synthetic alkaline furnish at 0.467% consistency. Shear speed and contact times were as described above. For calculating retention, 100 ml of effluent was drained, filtered, dried and weighed.

TABLE I

| Treatment | Dosage lbs/ton | CSF Drainage | % Fines Retention |
|---|---|---|---|
| Blank | — | 457 | 11.5 |
| Example 1 | 1.5 | 508 | 65.0 |
|  | 2.25 | 526 | 74.7 |
|  | 3.0 | 528 | 75.2 |
| Example 1/ | 1.5/4 | 587 | 74.5 |
| Bentonite | 2.25/4 | 639 | 88.2 |
| Clay | 3.0/4 | 666 | 92.3 |
| Example 2 | 1.5 | 510 | 67.7 |
|  | 2.25 | 527 | 74.0 |
|  | 3.0 | 542 | 77.2 |
| Example 2/ | 1.5/4 | 562 | 74.3 |
| Bentonite | 2.25/4 | 611 | 88.3 |
| Clay | 3.0/4 | 644 | 88.6 |
| Comparative | 1.5 | 492 | 63.3 |
| Example 1 | 2.25 | 500 | 68.5 |
|  | 3.0 | 507 | 71.6 |
| Comparative | 1.5/4 | 588 | 78.5 |
| Example 1/ | 2.25/4 | 634 | 90.3 |
| Bentonite | 3.0/4 | 666 | 93.4 |
| Clay |  |  |  |
| Comparative | .5 | 524 | 80.6 |
| Example 2* | .75 | 542 | 77.0 |
|  | 1.0 | 552 | 78.6 |
| Comparative | .5/4 | 587 | 75.0 |
| Example 2*/ | .75/4 | 649 | 90.8 |
| Bentonite | 1.0/4 | 671 | 91.5 |

*powder form: dosage different, so that results are based on an equal actives basis.

What we claim is:

1. A composition comprising a water soluble graft copolymer having the structure

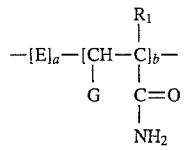

wherein E is the repeat unit obtained after polymerization of an α, β ethylenically unsaturated compound, the molar percentage of a:b is from about 95:5 to 5:95 with the proviso that the sum of a and b equals 100%; G comprises the structure:

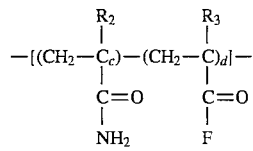

wherein $R_1$, $R_2$ and $R_3$ are the same or different and are hydrogen or a lower alkyl group having $C_1$ to $C_3$, F is the salt of an ammonium cation, d is a cationic monomer and the molar percentage c:d is from 95:5 to 5:95, with the proviso that the sum of c and d equals 100% and bentonite clay.

2. The composition of claim 1 wherein the ethylenically unsaturated compound is selected from the group consisting of (a) an ethylenically unsaturated carboxylic acid, the amide form thereof, the alkyl ($C_1$–$C_8$) ester thereof, the hydroxylated alkyl ($C_1$–$C_8$) ester thereof and ethylenically unsaturated sulfonic acid.

3. The composition of claim 2 wherein the ethylenically unsaturated carboxylic acid is selected from the group consisting of acrylamide, methacrylamide, acrylic acid, methacrylic acid, maleic acid, maleic anhydride, itaconic acid, 2-hydroxypropyl acrylate, methyl methacrylate and 2-ethylhexyl acrylate.

4. The composition of claim 2 wherein the ethylenically unsaturated sulfonic acid is selected from the group consisting of styrene sulfonic acid and 2-acrylamido-2-methylpropyl sulfonic acid.

5. The composition of claim 1 wherein F is selected from the group consisting of $NHR_3N+R_{(4,5,6)}M^-$, wherein $R_3$ is a $C_1$ to $C_4$ linear or branched alkylene group, $R_4$, $R_5$ and $R_6$ are selected from the group consisting of hydrogen, $C_1$ to $C_4$ linear or branched alkyl, $C_5$ to $C_8$ cycloalkyl, aromatic or alkylaromatic group; and $M^-$ is an anion selected from the group consisting of chloride, bromide, methyl sulfate and hydrogen sulfate.

6. The composition of claim 5 wherein the cationic monomer is selected from the group consisting of 2-acryloyloxyethyltrimethyl ammonium chloride, 3-methacrylamidopropyltrimethyl ammonium chloride, 2-methacryloyloxyethyltri-methylammonium chloride and diallyl dimethylammonium chloride.

7. The composition of claim 1 wherein the copolymer has the structure:

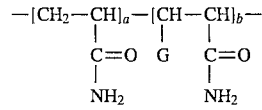

wherein the molar percentage of a:b is from about 95:5 to 5:95, with the proviso that the sum of a and b equals 100%, and G has the structure:

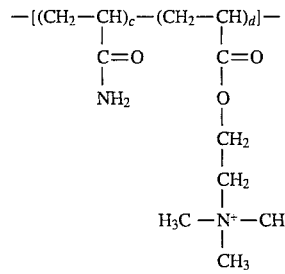

wherein the molar percentage of c:d is from 95:5 to 5:95 with the proviso that the sum of c and d equals 100%.

8. The composition of claim 1 wherein the copolymer has a number average molecular weight of from about 10,000 to 30,000,000.

9. The composition of claim 1 wherein the weight ratio of graft copolymer:bentonite clay is from about 2:1 to 1:20.

10. The composition of claim 1 further comprising pulp furnish.

* * * * *